United States Patent
Herbst

[11] Patent Number: 5,904,843
[45] Date of Patent: May 18, 1999

[54] APPARATUS FOR REMOVING SOLIDS FROM A STREAM OF WATER

[76] Inventor: Lori Herbst, 3550 S. Harlan, #345, Denver, Colo. 80235

[21] Appl. No.: 08/961,005
[22] Filed: Oct. 30, 1997
[51] Int. Cl.[6] ................................................ B01D 29/64
[52] U.S. Cl. ...................... 210/170; 210/407; 210/413; 210/414; 210/232
[58] Field of Search ................................. 210/169, 332, 210/407, 413, 414, 415, 408, 107, 159, 170, 232, 528

[56] References Cited

U.S. PATENT DOCUMENTS

| | | |
|---|---|---|
| 428,600 | 5/1890 | Garrison . |
| 945,857 | 1/1910 | McGowan . |
| 2,155,764 | 4/1939 | Lissauer ................................. 210/415 |
| 2,326,761 | 8/1943 | Collier . |
| 2,532,560 | 12/1950 | Lamb . |
| 2,682,811 | 7/1954 | Infanger . |
| 3,823,823 | 7/1974 | Dokter et al. ........................... 210/110 |
| 3,833,123 | 9/1974 | Walker ..................................... 210/241 |
| 4,065,382 | 12/1977 | Derrick . |
| 4,412,920 | 11/1983 | Bolton et al. ........................... 210/409 |
| 4,543,181 | 9/1985 | Greenwood . |
| 4,828,697 | 5/1989 | Kuhnt et al. ............................ 210/408 |
| 4,834,783 | 5/1989 | El-Saie ..................................... 96/183 |
| 4,961,864 | 10/1990 | Bruke ..................................... 210/791 |

FOREIGN PATENT DOCUMENTS

| | | |
|---|---|---|
| 1807711 | 5/1970 | Germany . |
| 61-263613 | 11/1986 | Japan . |

Primary Examiner—Jay H. Woo
Assistant Examiner—Fred Prince
Attorney, Agent, or Firm—Patnaude & Videbeck

[57] ABSTRACT

A compact and easily cleanable device for separating solids from a stream of liquid entering the device includes a hollow base having a screen positioned spatially above the bottom of the base and tilted forwardly and downwardly to define a plane which is recessed from an opening in the base which is generally parallel to the screen. A cover is hingedly mounted adjacent the top of the device and includes a motor centrally positioned externally thereon having a drive shaft extending through the cover to the interior side thereof. A pair of wiper blades are rotatably driven on the shaft and are positioned between the interior of the cover and the screen so as to have an edge of the wiper blade rotatably movable on the screen for moving solids collected on the screen around the output shaft and upwardly toward a cutout adjacent the top of the shaft where the solids may exit the device.

6 Claims, 5 Drawing Sheets

APPARATUS FOR REMOVING SOLIDS FROM A STREAM OF WATER

The present invention relates to an apparatus for removing solids from a stream of water, and in particular, to an apparatus including a self-cleaning screen.

BACKGROUND OF THE INVENTION

It is often desirable to remove solid matter from a stream of water prior to employing the water for industrial uses. Also, it is often desirable to remove solids, such as leaves and the like from the surfaces of swimming pools and ponds. Currently, such solids are removed by directing a water stream through a screen which traps large solid material and allows only the smaller particles to remain. Such screens, however, can become clogged or blinded when the solid material builds up on the surface thereof, preventing the water from passing through. To minimize the effect of blinding, very large screens have been employed to remove solids from a water stream. Several efforts have been made to improve the efficiency of screens such as the provision of a vibrator as shown in U.S. Pat. No. 4,065,382, and of a wiper as shown in U.S. Pat. No. 3,863,765. Such efforts, however, have not been entirely successful, and the machines remain large considering the amount of water passing therethrough. It would, therefore, be desirable to provide an improved device from a stream which would be more compact and easily cleanable.

SUMMARY OF THE INVENTION

Briefly, the present invention is embodied in a device for screening solids from a steam of water. The device has an enclosure with an interior and an exterior, and within the enclosure is a screen which is oriented at an angle such that the plane of the screen is neither horizontal nor vertical. The screen divides the enclosure into an input portion and an output portion, the input portion having an aperture for receiving liquid entering the device, and the output portion having an aperture for discharging the liquid after passing through the screen. The screen has an aperture therein and a chute extends through the aperture to communicate between the input portion of the enclosure and the exterior of the device. A rotatable wiper is mounted for wiping along the upper surface of the screen for pushing solids collecting thereon toward the chute to thereby remove solids separated by the screen, and to prevent the blinding of the apertures therein.

BRIEF DESCRIPTION OF THE DRAWINGS

A better understanding of the present invention will be had after a reading of the following detailed description taken in conjunction with the following drawings wherein.

DETAILED DESCRIPTION OF A PREFERRED EMBODIMENT

Figure 1:
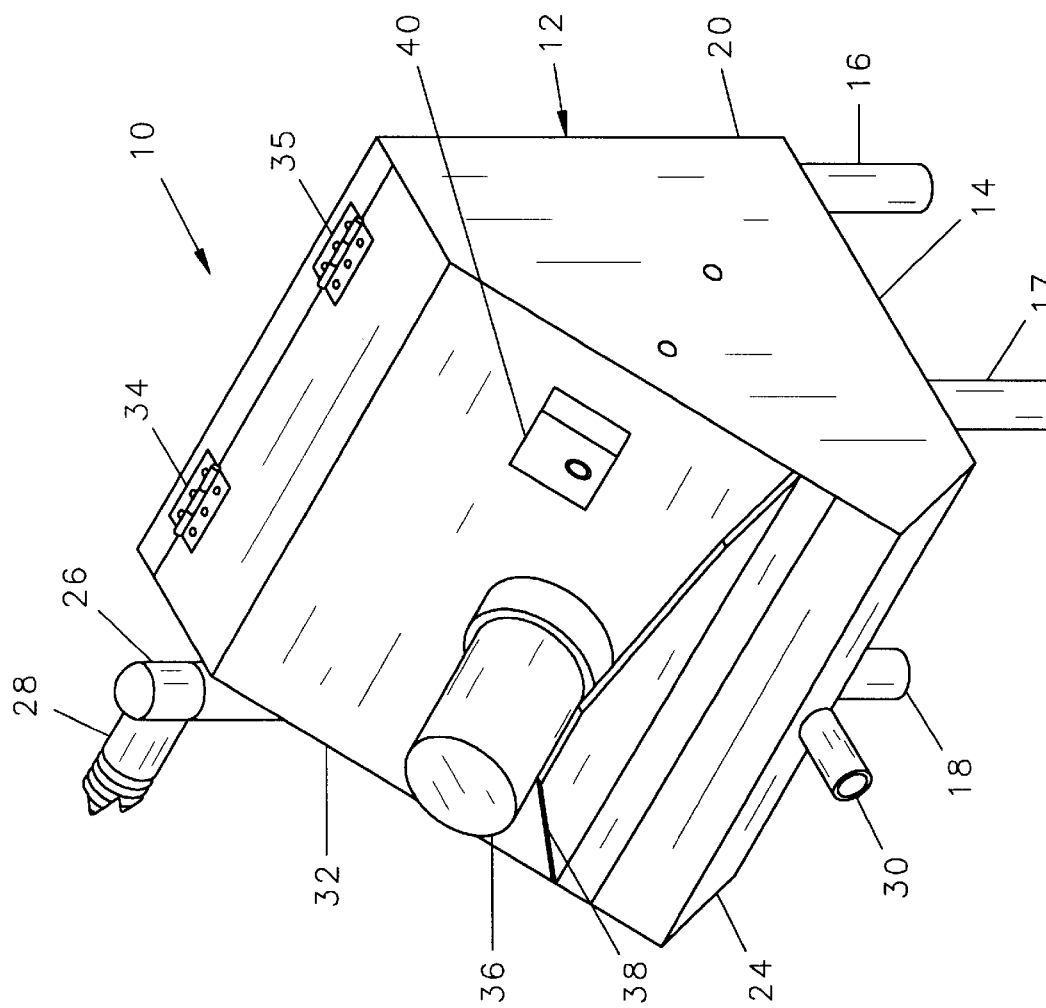
FIG. 1 is an isometric view of a device in accordance with the present invention with the cover of the enclosure in the closed orientation.
Figure 3:
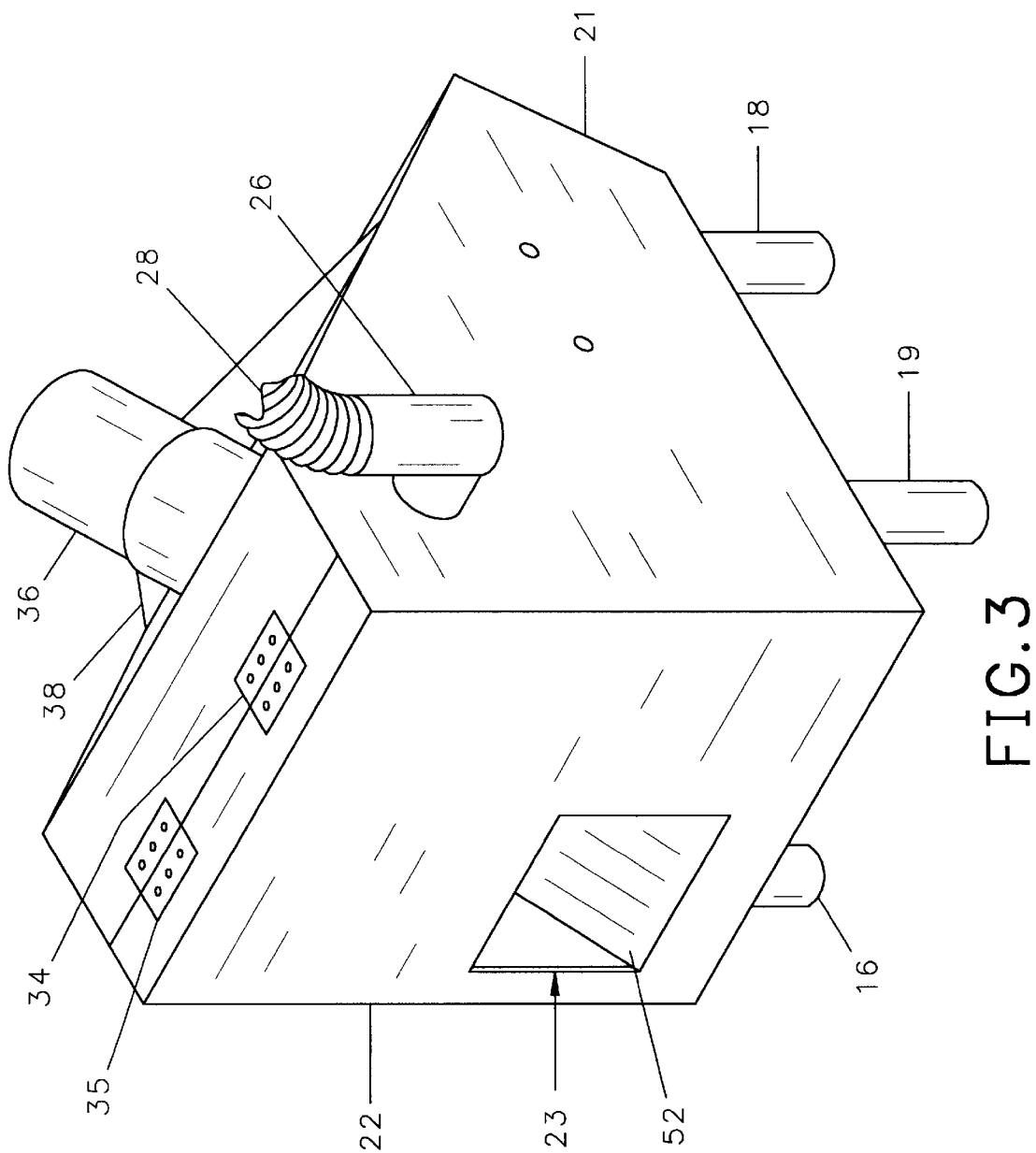
FIG. 3 is an isometric view of the enclosure shown in FIG. 1 as seen from the opposite side thereof.

Referring to FIGS. 1 and 3, a device 10 for screening solids from a liquid stream has an enclosure 12. The enclosure 12 has a generally horizontal base 14 supported by a plurality of legs 16, 17, 18, 19. Extending upward from the base 14 are a pair of opposing vertical walls 20, 21, and a vertical back 22. Piercing the lower surface of the back 22 is a debris discharge 23 through which solid material separated from the liquid is discharged. Opposite the back 22 is an inclined forward panel 24. Extending into one of the walls 21 is a tubular input connector 26 suitable for connecting to a tubular source line 28 for receiving a stream of liquid. Extending from the inclined front 24 is a tubular overflow port 30 for discharging liquid which has not passed through the screen, and extending downward from the base 14 is a tubular output 31 for discharging screened liquid.

The enclosure 12 includes a planar sloping upper panel 32 which is hinged at its upper end by hinges 34, 35. The surface of the upper panel 32 slopes at an angle of about 30 degrees. Extending perpendicular to the plane of the panel 32 is a generally cylindrical motor 36 which is retained in position by a support plate 38. The motor is controlled by an on-off switch 40 which is also positioned on the upper panel 32.

Figure 2:
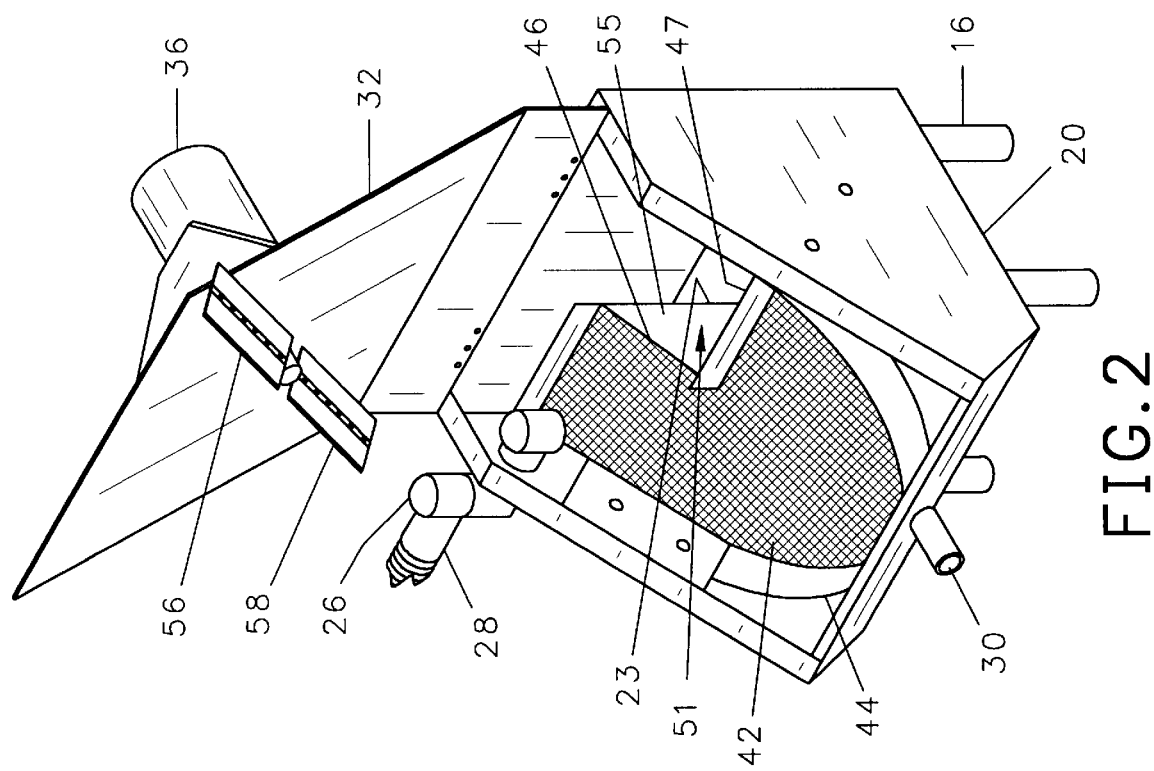
FIG. 2 is an isometric view of the device shown in FIG. 1 with the cover thereof in an open position.
Figure 4:
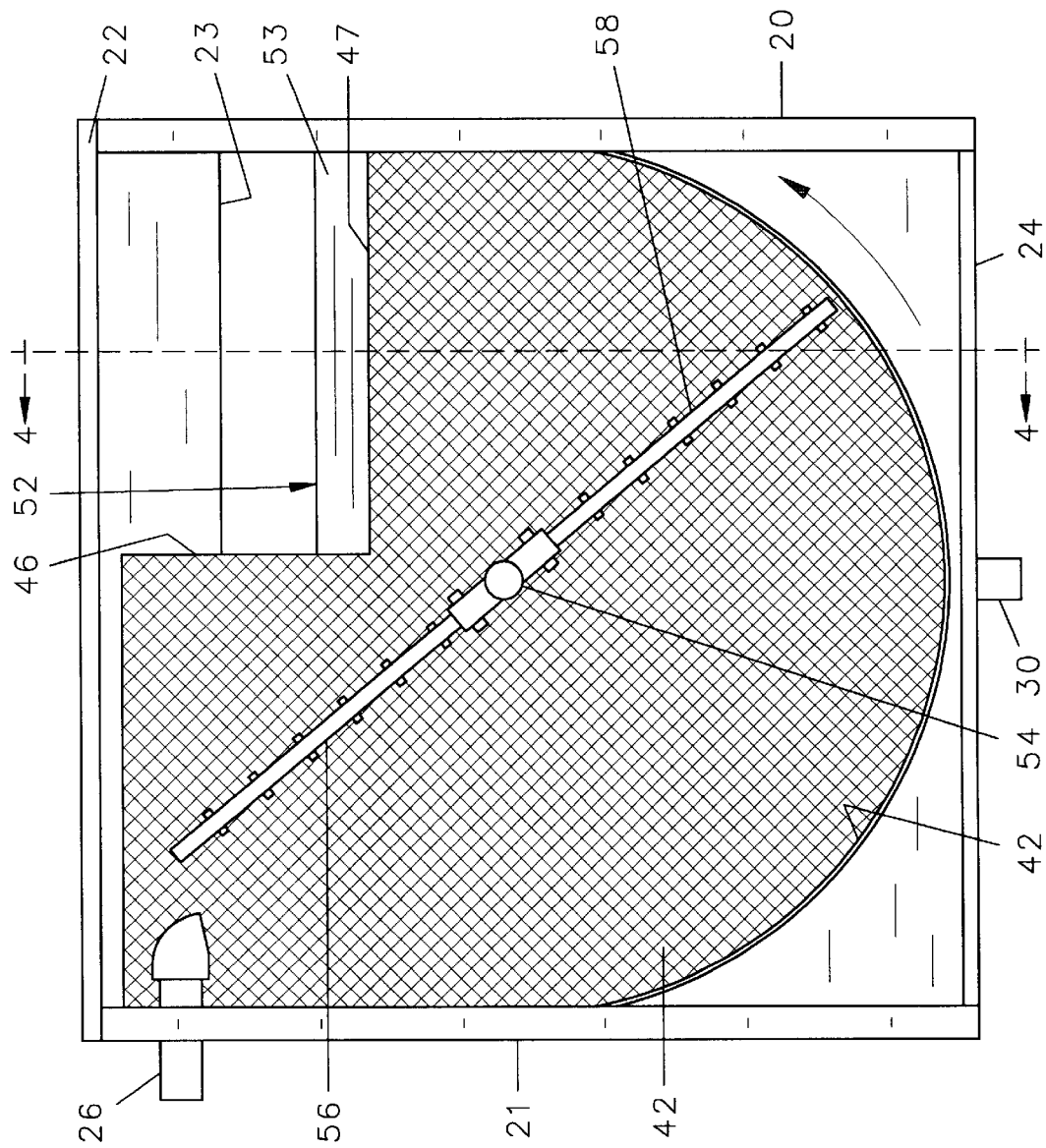
FIG. 4 is a front elevational view of the screen and wiper assembly of the device shown in FIG. 1.
Figure 5:
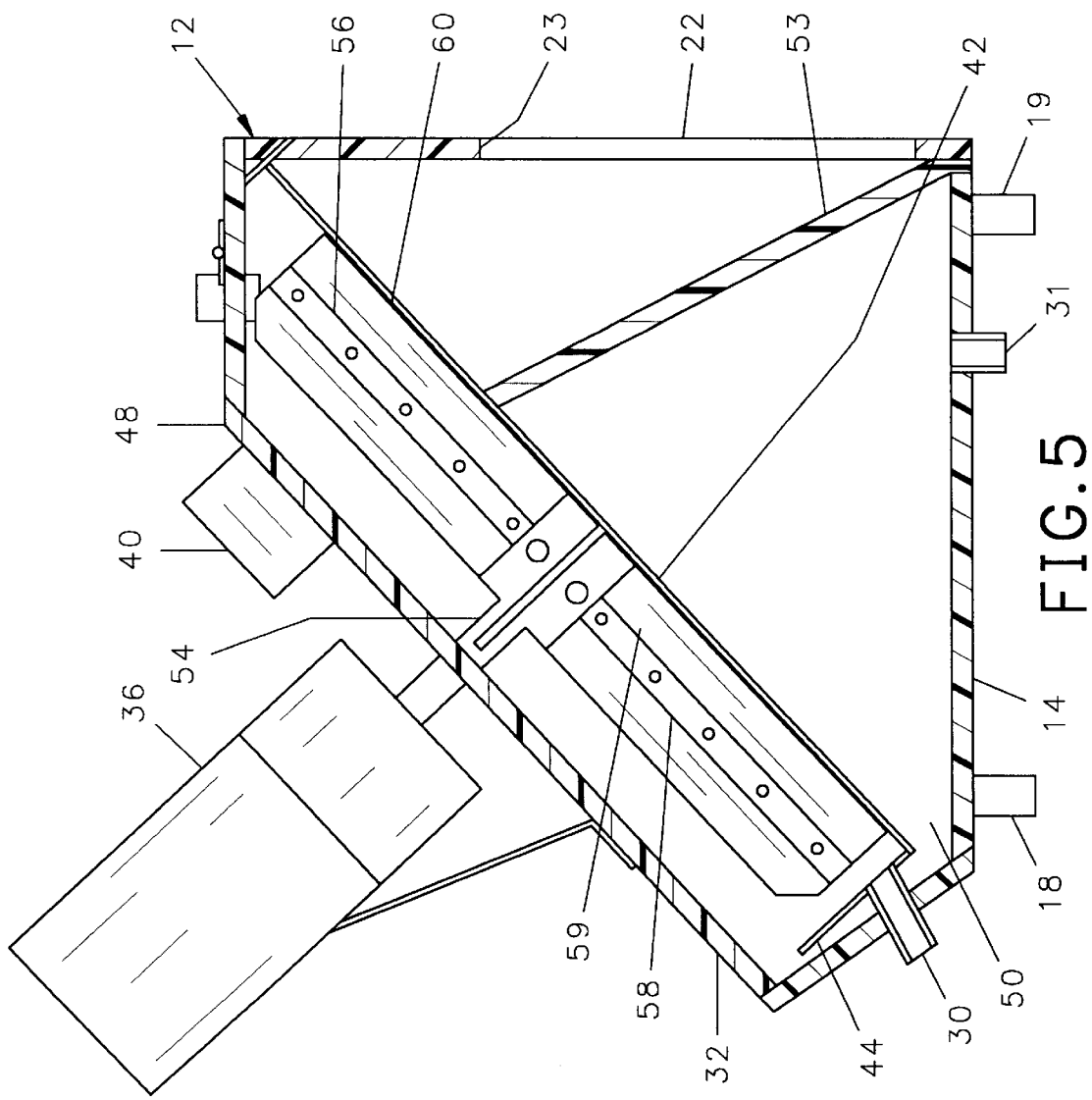
FIG. 5 is a cross-sectional view of the device shown in FIG. 1 taken through line 5—5 as shown in FIG. 4.

Referring to FIGS. 2, 4, and 5, positioned within the enclosure 12 is a generally planar screen 42 which is oriented at an angle substantially parallel to that of the sloping upper panel 32. Curved about the lower end of the upper surface of the screen 42 is a semicylindrical guard wall 44 and piercing the guard wall 44 is the inner end of the overflow port 30. At an upper corner of the screen 42 spaced from the input line 26 is a generally rectangular cut out portion defined by edges 46 and 47, such that the screen 42 does not extend across a horizontal cross section of the enclosure 12. The portion of the enclosure uncovered by the screen 42 is defined by edges 46, 47, portion of the wall 20, and a portion of the back 22. Except for the uncovered portion, the screen 42 divides the interior of the enclosure 12 into an upper input portion 48 and a lower output portion 50.

Extending downward from the portion uncovered by the screen is a chute 52 defined by a lower wall 53, a center wall 55, a portion of one side wall 20 and a portion of the back 22. The lower end of the chute 52 terminates at the debris discharge 23 at the back 22 of the enclosure 12. As can be seen, edges 46, 47 of the screen 42 join the upper edges of the lower wall 53 and the center wall 55, respectively, such that solids which are too large to pass through the screen and which are moved toward the chute 52 will fall into the chute 52 and not into the lower portion 50 of the enclosure.

The motor 36 has a drive shaft 54 which extends through the upper panel 32, and at the lower end of the drive shaft 54 are a pair of a rotary wipers 56, 58. Each of the wipers 56, 58 has an elongate metal body which extends radially outward from the drive shaft 54, and depending from the lower edge of each of the wiper bodies is an elongate rubberized wiper blade 59, 60. In the preferred embodiment, both of the wipers are hingedly joined to the shaft 54 for movement about an axis perpendicular to the shaft 54 and perpendicular to the longitudinal axis of the body of the wipers 56, 58, respectively, so as to be drawn downward by gravity against the screen 42 when the upper panel 32 is closed. As best shown in FIGS. 4 and 5, when the hinged upper panel 32 is in the closed position, the wiper blades 59, 60 wipe against the upper surface of the screen 42. In the preferred embodiment, the motor 36 will rotate the wipers 56, 58, counterclockwise as shown in FIG. 4, such that solid material is moved by the wipers 56, 58 upward toward the chute 52. Also, the shaft 32 and the guard wall 44 are coaxial and the radius of the inner surface of the guard wall 44 is a little longer than the radial length of each wiper such that the blades thereof will sweep across the lower portion of the screen 42 within the guard wall 44.

To operate the device 10 to remove solids from liquid received through a tubular source line 28, the line 28 is connected to the input 26 of the device, and the output line 31 is attached to a discharge line for receiving the screened liquid. Overflow port 30 is either connected to reinject unscreened liquid into the stream being received through line 28 or is connected to a pump and tubing, not shown, to recycle the liquid back to the upper end of the input portion 48. A source of electric power is applied to the motor 36 which rotates the wipers 56, 58 along the upper surface of the screen 42. Liquid received through the input 26 will then flow across the upper surface of the screen, and will fall from the input portion 48 through the screen 42 to the output portion 50. Solid material having dimensions larger than the dimensions of the apertures of the screen will be trapped on the upper surface thereof. The rotating wipers 56, 58 will sweep solid material on the upper surface of the screen 42 toward the material to the debris discharge 46. The solid material will then fall through the chute 52 and out the aperture 23 in the back 22 where it can be collected in a separate collection bin for disposal. Overflow liquid emitted through the overflow port 30 is recycled through the screen 42 as described above. The screened liquid will then pass through the output 31 at the bottom of the output portion 50 to a discharge line attached thereto, not shown.

Should the device become clogged, or for any reason require servicing, the switch 40 will turn off the motor 36 and the upper panel 32 can be opened, thereby allowing the screen 42 to be manually cleaned, as shown in FIG. 2.

While one embodiment of the present invention has been shown and described, it will be apparent to those skilled in the art that many changes and modifications may be made without departing from the true spirit and scope of the present invention. It is the intent of the appended claims to cover all such changes and modifications which fall within the true spirit and scope of the invention.

What is claimed:

1. A compact and easily cleanable device for removing solids from a stream of water comprising, an enclosure including a base having an interior, an exterior, a liquid input, a liquid output, a solids output, and an opening, a cover hingedly mounted on said base for covering said opening, a screen positioned within said interior of said enclosure base, said screen defining a plane, and including an upper surface thereon, said plane of said screen being angled between horizontal and vertical, and being generally parallel to and spatially recessed from said opening said screen dividing said interior into an input portion above said screen and an output portion below said screen, a cutout on said screen being positioned adjacent a top portion of said screen, a chute being in operative communication with said cutout on said screen and extending through said output portion of said enclosure base to an exterior thereof defining said solids output of said base, a semicylindrical guard having a height substantially equal to said spacial recess between said opening and said screen and being positioned around a lower portion of said screen to define a lower semicircular boundary of said screen, said cover including a motor mounted externally thereof and including an output shaft extending through said cover to an interior side thereof, said semicylindrical guard being coaxial with said output shaft, at least one wiper blade being rotatably driven on said output shaft, said wiper blade having a length about the length of the radius of said semicylindrical guard, and said blade having an edge which is rotatably movable on said screen for moving solids collected on said screen around said output shaft and upwardly toward said cutout.

2. The compact and easily cleanable device as defined in claim 1 wherein, said wiper blade is mounted on said output shaft and lifts outwardly of said recess when said hingedly mounted cover is opened to allow unencumbered access to said screen for cleaning same.

3. The compact and easily cleanable device as defined in claim 1 further including, an overflow outlet adjacent a lowest portion of said input portion of said enclosure base for allowing liquid not travelling through said screen to exit said device.

4. The compact and easily cleanable device as defined in claim 1 wherein, said axis of said output shaft defines the intersection of a pair of perpendicular planes, one parallel to a lower front of said enclosure base and a second parallel to the opposed side panels on said enclosure base, said perpendicular planes dividing said screen into four quadrants, two lower quadrants being bordered by said guard wall, one upper quadrant including said cutout, and a second upper quadrant being adjacent said liquid input.

5. The compact and easily cleanable device as defined in claim 4 wherein, said upper quadrant including said cutout is a first upper quadrant to be swept by said wiper blade as it rotates from a position over a lower quadrant.

6. The compact and easily cleanable device as defined in claim 5 wherein, said cutout includes at least two straight edges meeting at a right angle and an area of said cutout is more than half the area defined by said quadrant.

* * * * *